United States Patent
Long et al.

(10) Patent No.: US 8,437,880 B2
(45) Date of Patent: May 7, 2013

(54) SYSTEM AND METHOD FOR ENHANCEMENT OF POWER GENERATION FACILITIES

(75) Inventors: Christopher Eugene Long, Greer, SC (US); Robert Joseph Iasillo, Atlanta, GA (US); Jonathan Carl Thatcher, Liberty, SC (US); Kevin Thomas McCarthy, Troy, NY (US); Sameer Vittal, Atlanta, GA (US)

(73) Assignee: General Electric Company, Schenectady, NY (US)

( * ) Notice: Subject to any disclaimer, the term of this patent is extended or adjusted under 35 U.S.C. 154(b) by 270 days.

(21) Appl. No.: 12/781,775

(22) Filed: May 17, 2010

(65) Prior Publication Data

US 2011/0282500 A1  Nov. 17, 2011

(51) Int. Cl.
- *G06F 1/26* (2006.01)
- *G06G 7/62* (2006.01)
- *G06Q 10/00* (2012.01)

(52) U.S. Cl.
USPC .............................. 700/287; 700/291; 703/18

(58) Field of Classification Search ............... 700/28, 700/29, 30, 31, 286, 287, 291; 703/2, 13, 703/18; 705/7.11, 412
See application file for complete search history.

(56) References Cited

U.S. PATENT DOCUMENTS

| | | | |
|---|---|---|---|
| 5,447,059 A * | 9/1995 | Miller et al. | 73/112.03 |
| 6,067,482 A * | 5/2000 | Shapiro | 700/286 |
| 6,343,251 B1 * | 1/2002 | Herron et al. | 701/100 |
| 6,804,612 B2 * | 10/2004 | Chow et al. | 702/34 |
| 7,058,552 B2 | 6/2006 | Stothert et al. | |
| 7,243,042 B2 * | 7/2007 | Plotts et al. | 700/287 |
| 7,313,485 B2 * | 12/2007 | Plotts et al. | 702/34 |
| 7,451,601 B2 * | 11/2008 | Taware et al. | 60/773 |
| 7,582,359 B2 * | 9/2009 | Sabol et al. | 702/182 |
| 7,787,996 B2 * | 8/2010 | Draper et al. | 700/287 |
| 8,004,423 B2 * | 8/2011 | Mitchell et al. | 340/870.17 |
| 2003/0083827 A1 * | 5/2003 | Chow et al. | 702/34 |
| 2004/0102872 A1 | 5/2004 | Schick et al. | |
| 2004/0103068 A1 * | 5/2004 | Eker et al. | 705/412 |
| 2005/0209713 A1 | 9/2005 | Fuller | |
| 2008/0183404 A1 * | 7/2008 | Emami et al. | 702/34 |
| 2010/0102776 A1 * | 4/2010 | Uchida | 320/109 |

* cited by examiner

Primary Examiner — Charles Kasenge
(74) Attorney, Agent, or Firm — Fletcher Yoder P.C.

(57) ABSTRACT

A system and method for enhancing operation of a power generation system. The method includes receiving forecasts at a predictive control unit. The method also includes accessing via a controller real-time lifing models or near real-time lifing models in the predictive control unit. Additionally, the method includes accessing via the controller an enhancer configured to simulate operation of a power generating unit in the power generation system to generate an enhancement of the power generation system based on the forecasts and the real-time or near real-time lifing models.

16 Claims, 5 Drawing Sheets

SYSTEM AND METHOD FOR ENHANCEMENT OF POWER GENERATION FACILITIES

BACKGROUND OF THE INVENTION

The subject matter disclosed herein relates to economic enhancement and long-term maintenance scheduling of power generation facilities.

Traditionally, power generation facilities, or units within, are operated to meet immediate goals such as the market demand for power and emission regulations. These power generation facilities may include, for example, integrated gasification combined cycle (IGCC) power plants capable of generating energy from various hydrocarbon feedstock, such as coal, relatively cleanly and efficiently. IGCC technology may convert the hydrocarbon feedstock into a gas mixture of carbon monoxide (CO) and hydrogen ($H_2$), i.e., syngas, by reaction with oxygen and steam in a gasifier. These gases may be cleaned, processed, and utilized as fuel in a conventional combined cycle power plant. For example, the syngas may be fed into a combustor of a gas turbine of the IGCC power plant and ignited to power a gas turbine engine for use in the generation of electricity. That is, the gas turbine engine may combust a mixture of fuel and air to generate hot combustion gases, which in turn drive one or more turbines to generate electricity. Other types of power generation facilities may include coal fired or natural gas power plants.

The operation of, for example, a gas turbine in a power generation facility may typically be constrained in such a way that the expected wear on part life is known. Based on this expected wear on part life, operators may make a decision as to whether or not to produce power at a given time, or to cease power production for scheduled maintenance on one or more portions of, for example, the gas turbine engine. However, these scheduled maintenance periods may lead to undesirable outages of the power generation facility during a peak power generating season. Thus, there is a need for active scheduling of maintenance for portions of a power generation facility to avoid outages during favorable power generating periods.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a power plant control includes a predictive control unit comprising a memory configured to store at least one lifing model indicative of part life of a power generating unit and an enhancer configured to simulate operation of the power generating unit, and a controller configured to access the enhancer and the at least one lifing model to generate at least one setpoint indicative of operating conditions for the power generating unit based on utilization of the at least one lifing model during operation of the enhancer.

In a second embodiment, a power generation system includes a power generating unit, a predictive control unit comprising a memory storing an enhancer configured to simulate operation of the power generating unit based on at least one lifing model indicative of part life of the power generating unit and at least one forecast relating to predicted conditions affecting operation of the power generating unit, a controller configured to generate at least one setpoint indicative of operating conditions for the power generating unit via the enhancer, and a regulatory unit coupled to the power generating unit, wherein the regulatory unit is configured to receive the at least one setpoint from the controller and adjust operating conditions for the power generating unit based on the at least one setpoint.

In a third embodiment, a method for enhancing operation of a power generation system includes comprising receiving forecasts at a predictive control unit accessing via a controller real-time lifing models or near real-time lifing models in the predictive control unit, and accessing via the controller an enhancer configured to simulate operation of a power generating unit in the power generation system to generate an enhancement of the power generation system based on the forecasts and the real-time or near real-time lifing models.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

In certain embodiments, as discussed in detail below, a power generation facility may include a power generating unit, such as a gas turbine engine driven generator, with a plurality of parts that may require periodic maintenance and/or replacement. This maintenance may cause an interruption in the power generating ability of the power generation facility. Moreover, the schedule for maintenance for the plurality of parts may not typically overlap, causing the power generation facility to be offline (e.g., unable to generate power) at one period of time to perform maintenance on a first part as well as offline at a second period of time to perform maintenance on a second part. To aid in scheduling maintenance of a power generating unit, a predictive control unit may be utilized in the presently discussed embodiments.

The predictive control unit may control operational parameters of the power generating unit and may do so based on conditions such as the overall profitability of operating the power generation facility during certain periods of time. That is, the predictive control unit may schedule future maintenance outages by choosing whether or not it is more valuable, at a given time, to operate conservatively to delay maintenance through periods of high demand, or conversely to push the system hard in times of favorable price margins. The predictive control unit may monitor and predict the remaining life of one or more parts of, for example, the power generating unit part using statistics-based lifing models that may be coupled with, for example, current and forecasted fuel costs, spot electricity prices, and/or ambient temperatures to predict favorable market conditions.

The predictive control unit may then choose whether or not it is more valuable, at a given time, to operate conservatively (e.g., to delay maintenance through periods of high demand), or conversely to push the system hard (e.g., in times of favorable price margins). In this manner, the predictive control unit may aid in determining appropriate control actions to be taken with regard to short term operating decisions and how they will impact long-term lifing effects of the power generation facility. That is, the predictive control unit may choose an operation strategy that minimizes total operating cost over a future horizon of hours, days, weeks, months, and/or years by setting operation limits such as, for example, maximum allowable firing temperature (e.g., a temperature such as combustion temperature in the combustor of the power generating unit).

Accordingly, the predictive control unit may cause the power generating unit to operate at various rates so that the end of life of plurality of parts in the power generating unit may be synchronized. Furthermore, the part servicing, replacement, or maintenance of, for example, the power generating unit may be planned so as to avoid outages of the power generation facility during peak profitability periods. The scheduling of these outages may be based on, for example, forecasted spot prices of electricity, ambient conditions, fuel costs, and other factors that may be updatable. Through use of active scheduling of maintenance outages, operation of the power generation facility during, for example, favorable economic climates may be accomplished.

Figure 1:
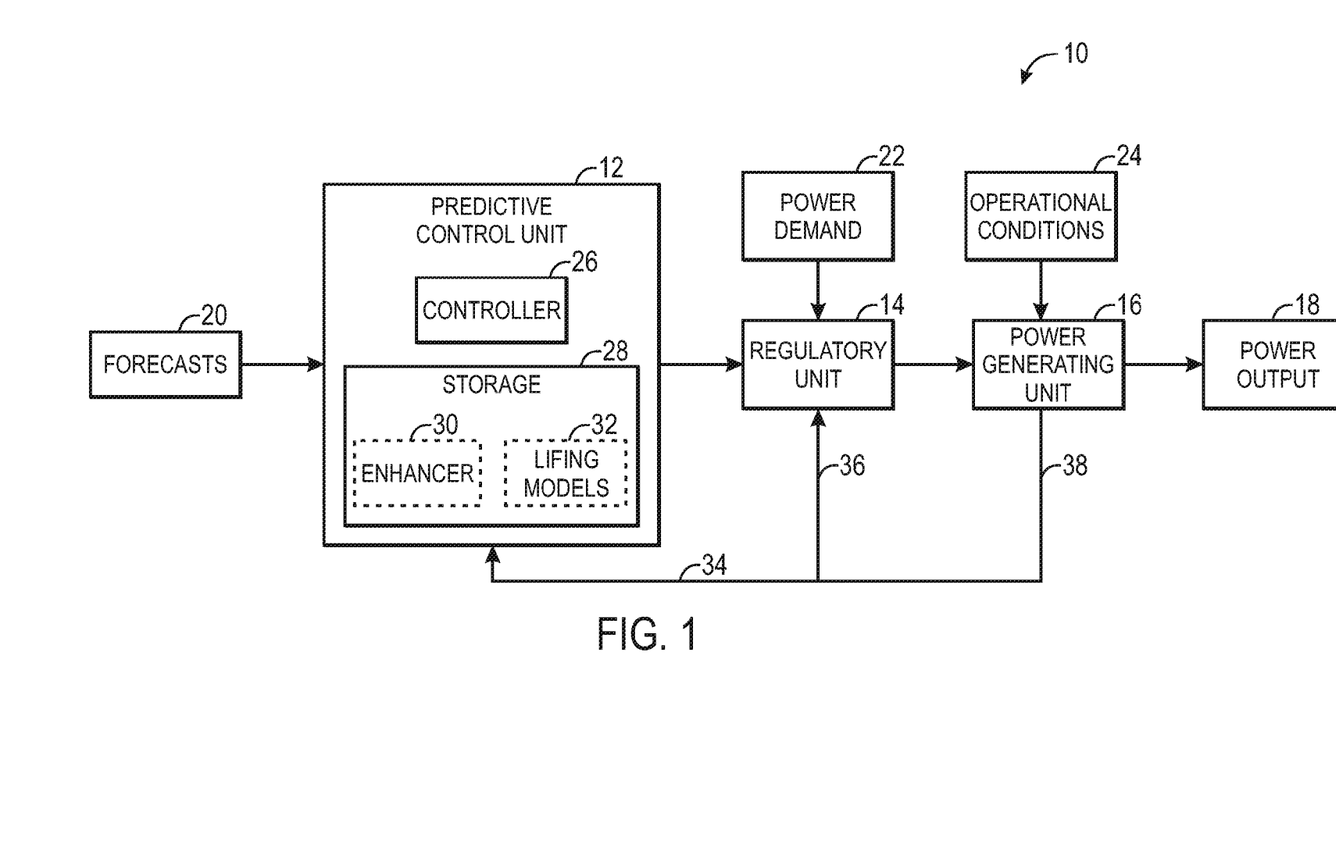
FIG. 1 a schematic block diagram of a health management system for a power generation facility in accordance with an embodiment of the present technique.

Turning now to the drawings and referring first to FIG. 1, a power generation facility 10 is illustrated. The power generation facility 10 may include a predictive control unit 12, a regulatory unit 14, and a power generating unit 16. The predictive control unit 12 may, for example, be integrated with the regulatory unit 14 or may be distinct from the regulatory unit 14. Regardless of configuration, the predictive control unit 12 may operate in conjunction with the regulatory unit 14 to alter the operation of the power generating unit 16. In this manner, the power output 18 generated by the power generating unit 16 may be customized, based on, for example, outside influences such as forecasts 20, power demand 22, and/or operational conditions 24, as will be discussed in greater detail below.

The predictive control unit 12 may be utilized for economic enhancement of the power generation facility 10 by dictating near-term operating strategies of the power generation facility 10, while simultaneously defining an enhanced long-term maintenance schedule for the power generation facility 10. The terms "enhancing" "enhancement" and/or "enhanced" are intended to include any process where the process includes optimization as minimizing cost or maximizing profit to better satisfy needs of the innovation's user(s). This method (or process), in accordance with one aspect, may make use of numerical routines, algorithms, transfer functions, or the like for enhancing or "optimizing."

The predictive control unit 12 may include a controller 26. The controller 26 may include one or more "general-purpose" microprocessors, one or more special-purpose microprocessors and/or application specific integrated circuits (ASICS), or some combination of such processing components, a central processing unit (CPU), and/or other types of processors. The predictive control unit 12 may also include storage 28, which may include one or more storage elements such as non-volatile storage including read only memory (ROM), flash memory, one or more hard drives, any other suitable optical, magnetic, or solid-state storage medium, or a combination thereof, and/or volatile storage, including random access memory (RAM). In one embodiment, the storage 28 may store various software programs, instructions, and/or data or data files to be processed by the controller 26. Thus, the predictive control unit 12 may include instructions for execution by a processor to facilitate the techniques disclosed herein. Alternatively, these techniques may be implemented by various additional hardware components.

Examples of the instructions, or software programs, which may be utilized to implement various power generation facility 10 enhancement techniques may include an enhancer 30 and lifing models 32. The enhancer 30 and lifing models 32 may, for example, be software programs and/or data stored in one or more storage elements of the storage 28. In one embodiment, the enhancer 30 may be utilized by the controller 26 to simulate (e.g., model) the operation of one or more elements of the power generation facility 10, such as the power generating unit 16. For example, the enhancer 30 may be utilized to simulate operation of the power generating unit 16 under specified conditions. These conditions may include forecasts 20, which may be retrieved from storage elements of the storage 28.

The forecasts 20 may include predicted conditions, for example, forecasted fuel costs, forecasted ambient conditions, forecasted power demand, forecasted estimates of the spot price of electricity, and/or other forecasted factors which might impact the generation of power by the power generation facility 10. In one embodiment, the controller 26 may receive the forecasts 20 from an outside source, such as an operator, and may overwrite any relevant data stored in the storage 28. In this manner, the forecasts 20 stored in storage 28 may be updated to include changes in forecasted fuel costs, forecasted spot prices of electricity, forecasted ambient temperatures, and/or other forecasted factors due to, for example, world events, weather phenomenon, and/or a shift in consumption patterns to allow for updated prediction of favorable market conditions for the generation of power by the power generating unit 16.

The controller 26 may utilize the enhancer 30 in conjunction with the forecasts 20 to balance, for example, short and long term operating strategies for the power generation facility 10. Additionally, the controller 26 may utilize information stored in the lifing models 32 the while running the enhancer 30. The lifing models 32 may, for example, include long term lifing-model information for elements of the power generation facility 10, such as components of the power generating unit 16. The lifing model information may relate to the amount of part life that has been consumed and/or the amount of part life remaining for various parts in the power generation facility 10.

The information relating to part life of elements of the power generation facility 10 may be initially programmed into the lifing models 32. This data may also be updatable. For example, estimates of the remaining part life for various elements of the power generation facility 10 may be transmitted to the lifing models 32 along a path 34 as an indication of the current remaining part life for various components of, for example, the power generating unit 16. These estimates of the remaining part life for various elements of the power generation facility 10 may be received by, for example, the controller 26, which may overwrite any relevant data stored in the lifing model 32 with the received estimates. In this manner, the lifing model 32 may be updated to include changes to the estimates of, for example, remaining and/or consumed part life of various parts in the power generation facility 10 such as the portions of the power generating unit 16. This updated information stored in the lifing models 32 may be utilized by the controller 26 while operating the enhancer 30 to schedule future maintenance outages for the power generation facility 10.

As noted above, the controller 26, when operating the enhancer 30, may utilize information or data from each of the lifing models 32 to determine appropriate control actions to be taken with regard to short term operating decisions and how they will impact long-term lifing effects of the power generation facility 10. That is, the controller 26 may utilize the data extracted from the lifing models 32 (where such lifing model data may have been updated in real-time as events occur, in near-real time including seconds or minutes after events occur, on a schedule, and/or by user request) to determine whether, for example, a part in the power generating unit 16 may be scheduled for replacement at a future opportunity or if it is expected that the life of the part will not meet the time of the next reasonably scheduled maintenance opportunity. This may be accomplished via modeling or simulating the operation of the power generation facility 10 under various specified conditions. These conditions may be, for example, generated by simulating operation of the power generation facility 10 utilizing the various lifing models 32 and forecasts 20. Based on these simulations, the predictive controller unit 12 may generate one or more setpoints that may be transmitted to the regulatory unit 14, which may, for example, include a processor for generation of control signals. These setpoints may be operational levels and/or operational limits for the power generating unit 16. For example, these setpoints may include levels of firing temperatures, internal turbine pressures, fuel splits (e.g., the amount of fuel transmitted through various fuel nozzles in a power generating unit 16), fuel to air ratios, and/or turbine blade speeds for the power generating unit 16. Accordingly, changing these setpoints may cause more conservative operation of, for example, the power generating unit 16 to push out a projected plant outage to a further date. Alternatively, the setpoints may be changes to cause more aggressive operation of, for example, the power generating unit 16 to maximize power output of the power generation facility in times of, for example, profitable power production periods, potentially pulling a projected plant outage in to an earlier date. The underlying result of the generation of setpoints by the predictive controller unit 12 may be generation of operation trajectories that reduce the cost of missed opportunities to sell power by having parts wearing out simultaneously, thus reducing the number of outages, and then doing so at desirable scheduled times.

The regulatory unit 14 may receive the setpoints from the controller 26 and may utilize the setpoints to control aspects of the power generating unit 16. For example, the setpoints may be utilized to specify operating limits of the power generating unit 16 such as the firing temperature of the power generating unit 16. Additionally, the regulatory unit may include other factors such as the power demand 22 (e.g., the amount of power to be generated by the power generating unit 10), as well as operational feedback from the power generating unit 16 along path 36. The operational feedback may include, for example, measurements relating to turbine speed, temperatures, pressures, and/or fuel flow of the power generating unit 16. Accordingly, the power generating unit 16 may transmit along path 38 measurements relating to both the amount of life left in various portions of the power generating unit 16 (for transmission along path 34) and operational feedback of the power generating unit 16 (for transmission along path 36).

Figure 2:
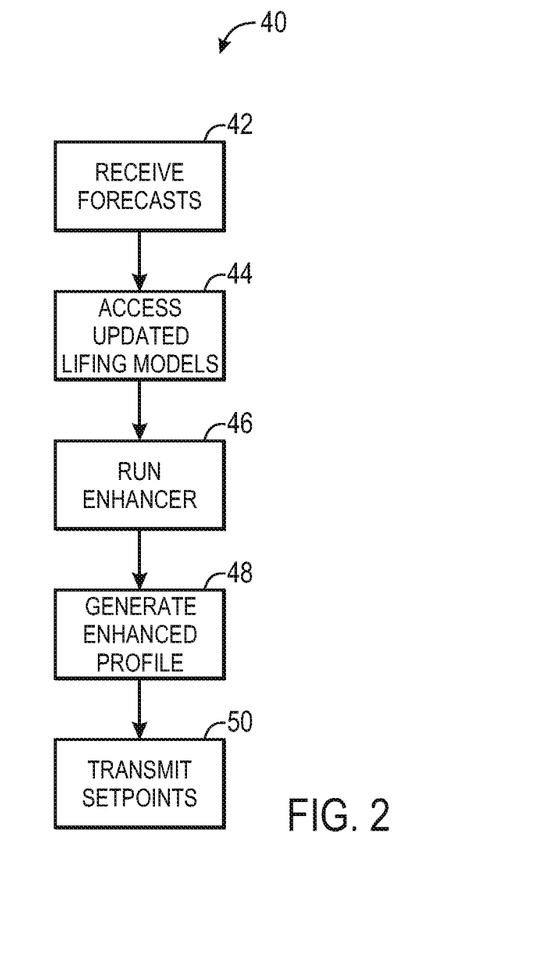
FIG. 2 is a flow chart of the operation of the health management system of FIG. 1 in conjunction with a power generating unit, in accordance with an embodiment of the present technique.

The process for generation of setpoints for control of the power generating unit 16 may be illustrated via the flowchart 40 of FIG. 2. In step 42, the predictive control unit 12 may receive forecasts 20, which may include, for example, forecasted fuel costs, forecasted ambient conditions (e.g., temperature), forecasted power demand, forecasted estimates of the spot price of electricity, prediction of natural disasters, weather forecasts, historical trends, or other indicia which might impact the generation of power by the power generation facility 10 to aid in setpoint generation for profit maximization and long-term maintenance scheduling of the power generation facility 10. In step 44, the controller 26 of the predictive control unit 12 may access the lifing models 32. These lifing models 32 may include the most recently updated data relating to, for example, remaining part life of at least one component of the power generating unit 16. In step 46, the controller 26 may run the enhancer 30. That is, in step 46, various simulations of operation of, for example, the power generating unit 16 may be undertaken via the enhancer 30. Alternatively, the enhancer 30 may formulate an enhancement problem (e.g., at least one equation including one or more operational constraints of the power generation facility 10) to be solved by the predictive control unit 12.

In step 48, an enhanced profile is generated by the predictive control unit 12. This enhanced profile may include a prediction of operational parameters to be applied to, for example, the power generating unit 16 over a course of hours, weeks, months, and/or years. The generation of this enhanced profile may include solving the enhancement problem or executing simulations of various outcomes based on changes to the setpoints (e.g., the operational levels and/or operational limits) for the power generating unit 16. Moreover, generation of an enhanced profile may include application of data from the forecasts 20 and the lifing models 32 to enhance short term and/or long term operating goals of the power generating unit 16. That is, current and forecasted conditions accessed in step 42 may be utilized in step 48 in conjunction with feedback from lifing models 32, which identify the current remaining life on parts of the power generating unit 16, to define an enhanced scenario in which the power generation facility 10 will operate by solving the enhancement problem or executing simulations of the operation of, for example, the power generating unit 16.

For example, the controller 26 may generate an enhanced profile for the power generating unit 16 (e.g. values of one or more setpoints to be utilized in conjunction with one another over a specified time horizon for enhancement of the power generation facility 10). That enhanced profile may include, for example, determining a firing temperature limit that will aid in synchronizing part life wear for two or more parts of the power generating unit 16 over a predicted time horizon. Additionally and/or alternatively, the enhanced profile may include, for example, an fuel split for the power generating unit 16 that will allow the power generation facility 10 to meet emissions levels or requirements over a predicted time horizon.

Based on the enhanced profile generated in step 48, setpoints are generated in the predictive control unit 12. As previously noted, these setpoints may be operational levels and/or operational limits for the power generating unit 16 such as firing temperatures, internal turbine pressures, fuel splits, fuel to air ratios, and/or turbine blade speeds for the power generating unit 16. For example, the determined firing temperature limit for a current time step (e.g., at least one minute, at least one hour, at least one day, at least one week, or at least one year) may be generated based on the identified enhanced profile. That is, the enhanced profile may include setpoints that are generated for transmission to the power generating unit 16.

Subsequently, in step 50, these setpoints are transmitted to the regulatory unit 14 for control of the power generating unit 16. Additionally, it should be noted that each of the steps 42-50 may be accomplished in real-time. That is, each of the steps 42-50 may be accomplished in response to events as they occur. Additionally or alternatively, it should be noted that each of the steps 42-50 may be accomplished in near real-time. That is, each of the steps 42-50 may be accomplished in response to events as after a period of time after they occur, for example, seconds or minutes after an event occurs.

This capability may be facilitated by, for example, data transmitted along path 34, and from updatable forecasts 20. Additionally, it should be noted that the process illustrated in flowchart 40 may be repeated at given time intervals (e.g., every 10 minutes, every 30 minutes, every hour, every six hours, every twelve hours, every day, every week, or every month), and/or as requested by, for example, a user.

Accordingly, FIG. 2 illustrates a predictive control methodology that accomplishes complete economic enhancement of the power generation facility 10 by dictating near-term operating strategies as well as simultaneously defining a long-term maintenance schedule for portions of the power generation facility 10 such as the power generating unit 16. As previously noted, enhancement may be accomplished by, for example, generating operational setpoints for control of the power generating unit 16 that may allow for an operation strategy that minimizes total operating cost over some future horizon, such as hours, days, weeks, months, or years by, for example, favorably scheduling future maintenance outages.

Figure 3:
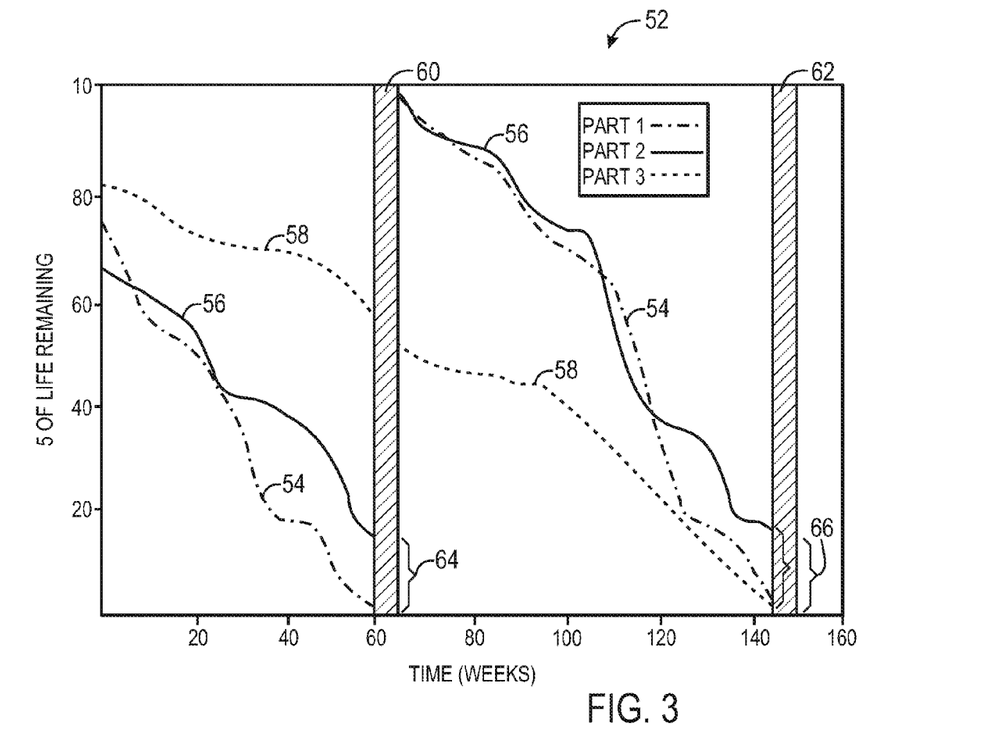
FIG. 3 is a graph illustrating predicted part life degradation of a power generating unit of FIG. 1, in accordance with an embodiment of the present technique.

FIG. 3 illustrates a graph 52 showing an example of predicted maintenance outages for three elements of a power generating unit 16. These elements of the power generating unit 16 may include, for example, a combustor, a drive shaft, turbine buckets, nozzles, and/or other elements typically found in a power generating unit 16. The graph 52 depicts the percent of life remaining versus time for each of three parts of the power generating unit 16 described above. As may be seen in the graph 52, part 1 may have a path 54 that illustrates the amount of part life remaining for part 1 over a time horizon with the power generating unit 16 operating at a given set of operational setpoints. Similarly, part 2 may have a path 56 and part 3 may have a path 58 that illustrates the respective amount of part life remaining for each of parts 2 and 3 over a time horizon with the power generating unit 16 operating at the same given set of operational setpoints as part 1. As may be seen in the graph 52, the path 54 of part 1 may illustrate the fastest consumption of part life. That is, part 1 may be completely spent in 60 weeks time as a power generating unit 16 is operated at a given set of operational setpoints. Accordingly, when part 1 is spent (i.e., consumed), the power generation facility 10 may be shut down for maintenance, for a period of time, as illustrated by maintenance outage 60. During this maintenance outage 60, part 1 may be replaced. Additionally, replacement of part 2 may be accomplished during the maintenance outage 60, so that another outage does not occur at a time of around 80 weeks. That is, a single maintenance outage 60 may occur instead of two outages occurring in a relatively short period (e.g., within approximately 20 weeks of one another) and both part 1 and part 2 may be replaced during the maintenance outage 60.

Upon replacement of parts 1 and 2, the power generating unit 16 may continue to operate until each of parts 1, 2, and 3 are short on remaining part life. This may occur after, for example, approximately 150 weeks of operation. At this point, each of parts 1, 2, and 3 may have less than approximately 20% of their respective part life remaining. Accordingly, a second maintenance outage 62 may be scheduled to replace each of parts 1, 2, and 3 concurrently. As discussed above, the power generating unit 16 in the example illustrated in graph 52 was operated at a given set of setpoints during the entire period illustrated. However, these operational setpoints may generate throw away costs associated with replacing multiple parts at the maintenance outages 60 and 62. For example, there is a throw away cost 64 and 66 of approximately 15% for part 3 when part 3 is replaced during maintenance outages 60 and 62. That is, part 3 has approximately 15% usable life remaining when replaced during the maintenance outages 60 and 62. Generation of the setpoints for the power generating unit 16 may help to reduce these throwaway costs 64 and 66. Additionally, it may be true that either or both of the maintenance outages 60 and 62 occur at unfavorable times. That is, these maintenance outages 60 and 62 may occur during peak profitability times when it would be advantageous for the power generation facility 10 to be producing power.

Figure 4:
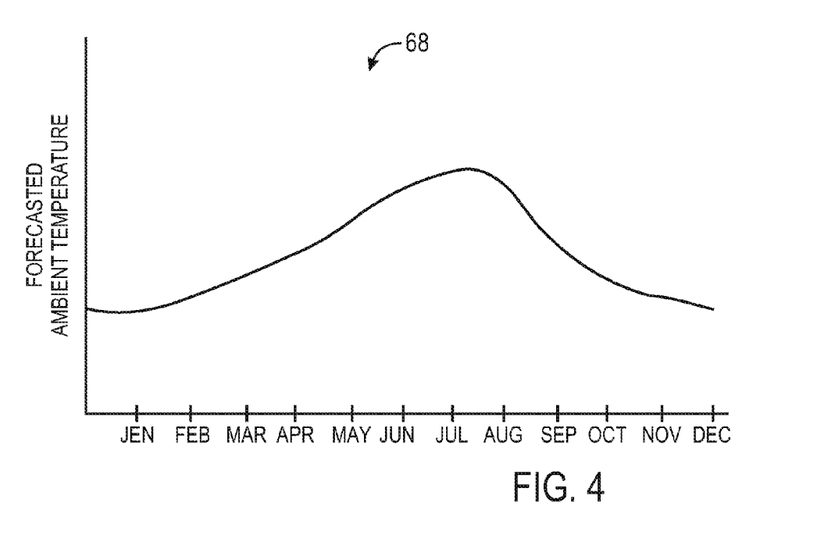
FIG. 4 is a first graph illustrating ambient conditions impacting ability to generate power across time periods, in accordance with an embodiment of the present technique.
Figure 5:
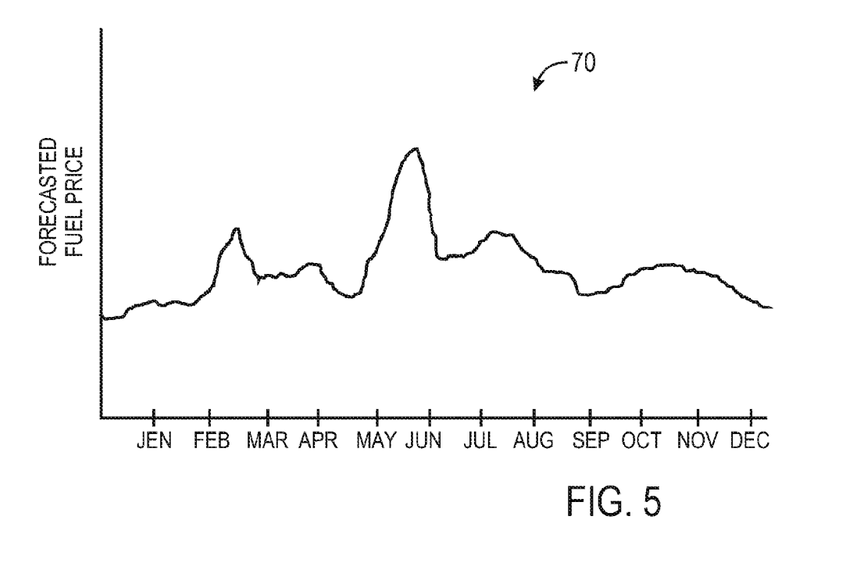
FIG. 5 is a second graph illustrating forecasted fuel costs across various time periods, in accordance with an embodiment of the present technique.
Figure 6:
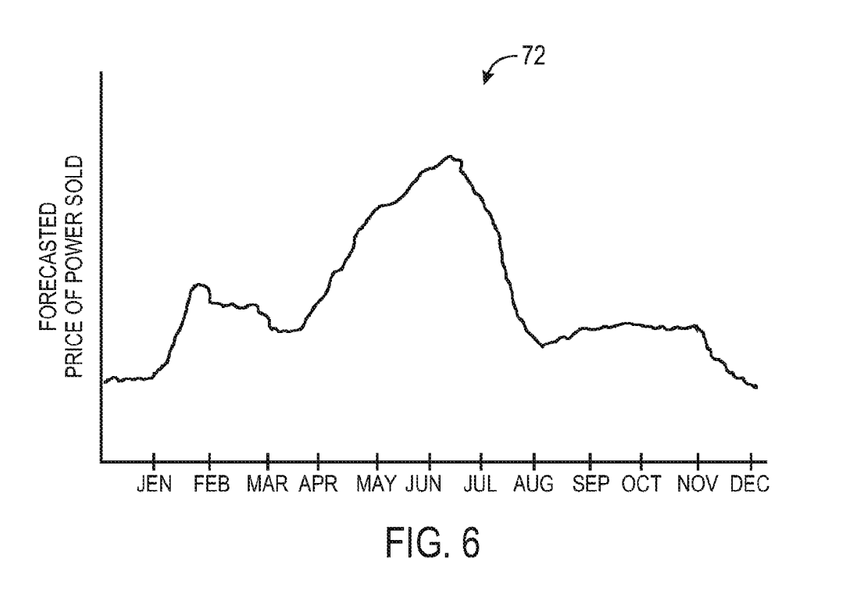
FIG. 6 is a graph illustrating changes in the overall price of generated energy across various time periods, in accordance with an embodiment of the present technique.

Each of FIGS. 4-6 depicts a respective graph 68, 70, and 72 that illustrates factors that may affect the profitability of the power generation facility 10. For example, graph 68 in FIG. 4 illustrates a curve representing forecasted ambient temperatures throughout the year for a given power generation facility 10. The ambient temperature may affect the overall efficiency of the power generation facility 10. Accordingly, information, such as that illustrated in graph 68, may allow for the planning of maintenance outages, such as 60 and 62, in light of the predicted ambient temperature of the power generation facility 10 and any corresponding efficiency differences for the power generation facility 10 resulting therefrom.

Similarly, graph 70 in FIG. 5 illustrates a curve representing the forecasted cost of fuel throughout the year for a given power generation facility 10. The cost of fuel at various times during the year may affect the overall cost of producing power at the power generation facility 10. Accordingly, information, such as that illustrated in graph 70, may allow for the planning of maintenance outages, such as 60 and 62, in light of the predicted fuel costs of the power generation facility 10.

Additionally, graph 72 in FIG. 6 illustrates a curve representing the forecasted price that power generated by the power generation facility 10 may be sold at throughout the year. The price at which power may be sold at may be a factor in determining when to schedule a maintenance outage, such as 60 and 62. For example, it may be favorable to limit the amount of outages for a given power generation facility 10 during times of the year when the sale price of power tends to be at or near its peak.

Information such as that illustrated in FIGS. 4-6 may be valuable for favorably scheduling future maintenance outages. For example, the predictive control unit 12 may take into account the price that power may be sold for on one or more days, as well as the predicted cost of fuel and overall power generation facility 10 efficiency in light of expected ambient temperatures on those same days. In certain cases, the information in the graphs 68, 70, and 72 may individually point to different days for scheduling a maintenance outage, such as 60 and 62. However, the controller 26 of the predictive control unit 12 may utilize information from each of the graphs 68, 70, and 72 to determine the overall costs of producing power versus prices that power can be sold at on the one or more days. In this manner, the predictive control unit 12 may determine a favorable maintenance period, such as maintenance outages 60 and 62.

Moreover, by monitoring and predicting the remaining life of various parts using statistics-based lifing models 32, as well as utilizing information related to current and forecasted fuel costs, spot prices, ambient temperatures, minimization of fuel consumption, maximization of power sold, minimization of missed opportunities to sell power (while operating conservatively), minimization of missed opportunities to sell power (while down for maintenance), minimization of "throw-away cost" of parts thrown away prematurely, minimization of the part life consumed (asset value degradation), minimization of maintenance (labor) costs, the ability to meet emissions levels or requirements, and/or minimization of start-up costs, the predictive control unit 12 may be able to predict favorable market conditions via, for example, generation of an enhanced profile performed via the controller 26. In one embodiment, each of the aforementioned objectives may be assigned a value such that certain objectives may weigh more heavily in the determination of total profit maximization. For example, the information in graph 68 may have a weight modifier of 1, while the information in graphs 70 and 72 may have weight modifiers of 1.5 and 2, respectively. That is, the information in graph 72 may have twice as much impact on the enhancement of the power generation facility 10 as the information in graph 68.

As discussed above, the controller 26 may choose whether or not it is more valuable at a given time, for example, to operate conservatively to delay maintenance through periods of high demand, to push the power generating unit hard in times of favorable price margins. These decisions will, additionally, affect whether, for example, a part in the power generating unit 16 can be scheduled for replacement at future opportunities or if it is expected that its life will not meet the time of the next reasonably scheduled maintenance opportunity. As such, the predictive controller unit 12 may reduce the cost of missed opportunities for profit by having key parts wearing out simultaneously, thus reducing the number of outages and/or scheduling the outages at desirable scheduled times.

Figure 7:
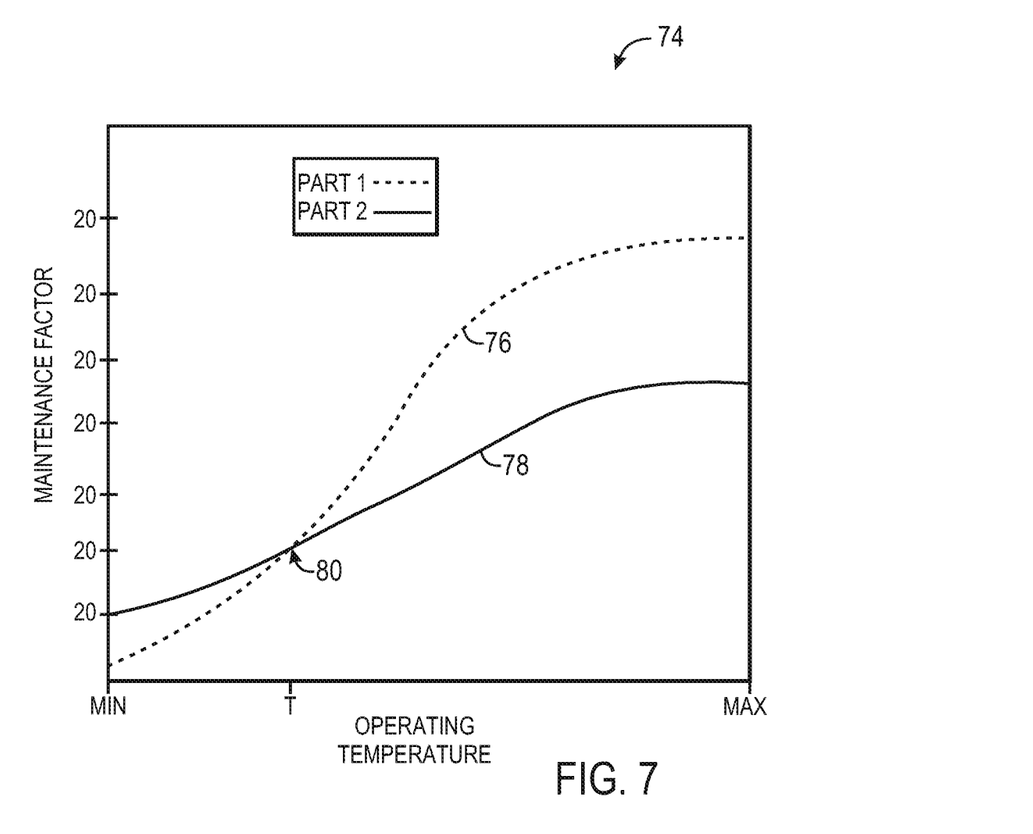
FIG. 7 is a graph illustrating maintenance factors for multiple parts in a power generation facility when operated at various conditions in accordance with an embodiment of the present technique.

In addition to profit maximization, the predictive control unit 12 may also be utilized to reduce throwaway costs such as throwaway costs 64 and 66 of FIG. 3. FIG. 7 illustrates a graph 74 of operating temperature of the power generating unit 16 versus the maintenance factor for two parts. As may be seen in the graph 74, part 1 may have a path 76 that illustrates the maintenance factor (the speed at which the part will use up its part life) with the power generating unit 16 operating at a given firing temperature setpoint. Similarly, part 2 may have a path 78 that illustrates the maintenance factor (the speed at which the part will use up its part life) with the power generating unit 16 operating at a given firing temperature setpoint. As may be seen in the graph 74, part 1 and part 2 may have a maintenance factor of 1 at a temperature T at point 80. That is, at point 80, each of part 1 and part 2 may consume their respective part lives at a shared rate. However, as may be seen in the graph 74, generally, higher firing temperature implies faster rate of consumption for each given part. However, part 1 and part 2 may not degrade at the same rate. Thus, the relative impact of, for example, firing temperature on the life of various parts 1 and 2 differs. In one embodiment, instrumentation may be used to identify health indicators that are also considered when determining the impact on part life.

Thus, through use of data from graph 74, the controller 26 may modify a setpoint of the power generating unit 16, for example, the firing temperature such that the parts 1 and 2 may have their lives end at similar times (i.e., during the same maintenance outage, such as 60 and 62). That is, part 1 consumes part life faster (has a higher maintenance factor) than part 2 at higher firing temperatures (above temperature T at point 80). Moreover, at lower firing temperatures (below temperature T at point 80), part 2 consumes life faster than part 1. Thus, through modification of, for example, the firing temperature setpoint of the power generating unit 16, the overall part life of part 1 and part 2 may be adjusted to terminate at the same maintenance outage, such as 60 and 62. In this manner, throwaway costs, such as costs 64 and 66 of FIG. 3, may be minimized by generating favorable setpoints transmitted to the power generating unit 16.

Technical effects of the subject matter detailed above include the ability to schedule and adjust maintenance and/or replacement of components of a power generating facility 10, for example, via a predictive control unit 12 that may control operational parameters of a power generating unit 16 of the power generation facility 10 based on conditions such as the overall profitability of operating the power generation facility 10 during certain periods of time. Other effects include the ability to monitor and predict the remaining life of one or more parts of, for example, the power generating unit 16 part using statistics-based lifing models that may be coupled with, for example, current and forecasted fuel costs, spot electricity prices, and/or ambient temperatures to predict favorable market conditions. Further effects include choosing an operation strategy that minimizes total operating cost of the power generation facility 10 over a future horizon of hours, days, weeks, months, and/or years by setting operation limits such as, for example, maximum allowable firing temperature (e.g., a temperature such as combustion temperature in the combustor of the power generating unit 16) and/or causing the power generating unit 16 to operate at various rates so that the end of life of plurality of parts in the power generating unit 16 may be synchronized. Accordingly, technical effects may include utilizing active scheduling of maintenance outages and/or operation of the power generation facility 10 during, for example, favorable economic climates.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A power plant management device comprising:
   a predictive control unit comprising:
      a memory configured to store at least one lifing model correlated to a part life of a power generating unit and an enhancer configured to simulate operation of the power generating unit; and
      a controller configured to access the enhancer and the at least one lifing model to generate at least one setpoint indicative of operating conditions for the power generating unit based on utilization of the at least one lifing model during operation of the enhancer, wherein the controller is configured to schedule a maintenance outage of the power generating unit based on the at least one setpoint.

2. The power plant management device of claim 1, wherein the predictive control unit is configured to update the at least one lifing model in the memory with real-time or near real-time received data.

3. The power plant management device of claim 1, wherein the at least one setpoint comprises a firing temperature for the power generating unit.

4. The power plant management device of claim 1, comprising a regulatory unit configured to receive the at least one setpoint from the controller and adjust operating conditions for the power generating unit based on the at least one setpoint.

5. The power plant management device of claim 1, wherein the predictive control unit is configured to receive forecasts relating to predicted conditions affecting operation of the power generating unit and wherein the controller is configured to access the received forecasts for utilization by the enhancer during operation of the enhancer.

6. A power generation system, comprising:
   a power generating unit;
   a predictive control unit comprising:
      a memory storing an enhancer configured to simulate operation of the power generating unit based on at least one lifing model correlated to a part life of the power generating unit and at least one forecast relating to predicted conditions affecting operation of the power generating unit; and
      a controller configured to generate at least one setpoint indicative of operating conditions for the power generating unit via the enhancer, wherein the controller is configured to transmit the at least one setpoint to schedule a maintenance outage of the power generating unit; and
   a regulatory unit coupled to the power generating unit, wherein the regulatory unit is configured to receive the at least one setpoint from the controller and adjust operating conditions for the power generating unit based on the at least one setpoint.

7. The power generation system of claim 6, wherein the at least one forecast comprises data indicative of fuel price, ambient temperature information, or electricity price.

8. The power generation system of claim 6, wherein controller is configured to adjust weight factors of a first forecast relative to a second forecast during simulation of operation of the power generating unit.

9. The power generation system of claim 6, wherein the controller is configured to generate the at least one setpoint to change a first rate of part life wear of at least a first part in the power generating unit relative to a second rate of part life wear of at least a second part in the power generating unit.

10. The power generation system of claim 6, wherein the controller is configured to generate the at least one setpoint to enhance profitability of the power generating unit.

11. The power generation system of claim 6, wherein the least one setpoint comprises a firing temperature or a fuel split for the power generating unit.

12. The power generation system of claim 6, wherein the controller is configured to account for a throw-away cost of parts to in the power generating unit to enhance profitability of the power generating unit.

13. A method for enhancing operation of a power generation system, comprising:
    receiving forecasts at a predictive control unit;
    accessing real-time lifing models correlated to part lives of elements in a power generating unit or near real-time lifing models correlated to part lives of elements in a power generating unit via a controller in the predictive control unit; and
    accessing via the controller an enhancer configured to simulate operation of the power generating unit in the power generation system to generate an enhancement of the power generation system based on the forecasts and the real-time or near real-time lifing models, wherein generating the enhancement of the power generation system comprises accessing current conditions affecting the power generation system and applying the current conditions affecting the power generation system with the real-time or near real-time lifing models and the forecasts to execute simulations of operation of the power generation system; and
    identifying via the controller an enhanced operational profile comprising at least one setpoint indicative of operating conditions for scheduling of an outage of the power generating unit.

14. The method of claim 13, comprising identifying an enhanced operational profile comprising at least one setpoint indicative of operating conditions for the power generating unit for economic enhancement of the power generating unit.

15. The method of claim 13, comprising identifying an enhanced operational profile comprising at least one setpoint indicative of operating conditions for the power generating unit for enhancement of part life wear of at least one part in the power generating unit.

16. The method of claim 13, comprising receiving data relating to part life wear of at least one part in the power generating unit and updating the real-time or near real-time lifing models relating to the at least one part.

* * * * *